United States Patent
Maekawa et al.

(10) Patent No.: US 6,716,944 B2
(45) Date of Patent: Apr. 6, 2004

(54) WATER AND OIL REPELLENT COMPOSITION

(75) Inventors: Takashige Maekawa, Yokohama (JP); Minako Shimada, Yokohama (JP); Shuichiro Sugimoto, Yokohama (JP); Ryuji Seki, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/317,991

(22) Filed: Dec. 13, 2002

(65) Prior Publication Data

US 2003/0130457 A1 Jul. 10, 2003

Related U.S. Application Data

(63) Continuation of application No. PCT/JP02/03686, filed on Apr. 12, 2002.

(30) Foreign Application Priority Data

Apr. 13, 2001 (JP) .................................... 2001-115676

(51) Int. Cl.[7] ............................................. C08F 118/00
(52) U.S. Cl. ....................... 526/245; 526/242; 524/529; 524/543
(58) Field of Search ................. 526/245, 242; 524/529, 543

(56) References Cited

U.S. PATENT DOCUMENTS

| | | | |
|---|---|---|---|
| 5,057,577 A | * 10/1991 | Matsuo et al. | 525/276 |
| 5,646,222 A | * 7/1997 | Maekawa et al. | 526/243 |
| 5,688,309 A | * 11/1997 | Shimada et al. | 106/2 |
| 5,876,617 A | * 3/1999 | Sato et al. | 252/8.62 |
| 5,883,175 A | * 3/1999 | Kubo et al. | 524/458 |
| 6,048,941 A | * 4/2000 | Yamana et al. | 525/200 |
| 6,251,984 B1 | 6/2001 | Shimada et al. | 524/507 |
| 6,376,592 B1 | 4/2002 | Shimada et al. | 524/457 |

FOREIGN PATENT DOCUMENTS

| | | |
|---|---|---|
| EP | 0 247 489 | 12/1987 |
| JP | 63-75082 | 4/1988 |
| JP | 63-99285 | 4/1988 |
| JP | 1-153784 | 6/1989 |
| JP | 2000-160147 | 6/2000 |

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A water and oil repellent composition which can impart an excellent water and oil repellency to an object, even if it is processed at a low temperature, and which can achieve a water and oil repellent treatment providing a soft hand. The water and oil repellent composition which has as an essential component a copolymer consisting essentially of polymerized units of the following monomer (a) and polymerized units of the following monomer (b).

monomer (a): an $R^f$ monomer wherein the melting point of fine crystals derived from the $R^f$ groups of the homopolymer does not exist or is at most 50° C.

monomer (b): a monomer having no $R^f$ group, wherein the melting point of fine crystals derived from the side chains of the homopolymer is at least 30° C.

23 Claims, No Drawings

WATER AND OIL REPELLENT COMPOSITION

TECHNICAL FIELD

The present invention relates to a water and oil repellent composition which can impart water and oil repellency and an antifouling property to an object.

BACKGROUND ART

Heretofore, techniques of coating an object with a hydrophobic solid material having a small surface tension to modify the surface of the object, have been known. For example, there is a technique of treating an object with a low molecular weight hydrocarbon compound, such as a hydrophobic wax, a carbonic acid having at least one long-chain alkyl group in its molecule, an amine or a thiol, an acrylate type or vinyl type high molecular weight compound, or a silicone. However, such a hydrocarbon type low molecular weight compound or a silicone had a disadvantage that it can not impart oil repellency, although it can impart water repellency to an object.

On the other hand, as a technique for imparting water repellency and oil repellency at the same time, it has been common to treat an object with an organic solvent solution or an aqueous dispersion of a polymer containing polymerized units of a polymerizable monomer containing a polyfluoroalkyl group (hereinafter, a polyfluoroalkyl group will be referred to as an $R^f$ group) in its molecule or a copolymer of such a polymerizable monomer with other monomers (hereinafter such polymer and copolymer will be commonly referred to also as an $R^f$ group-containing polymer), or a low molecular weight compound having an $R^f$ group.

The development of such water and oil repellency is caused by formation of "a surface having a low surface energy" where the critical surface tension is low, which is formed on the surface of the coating film by a surface orientation of $R^f$ groups. It has been considered that in order to develop both water repellency and oil repellency, the orientation of $R^f$ groups on the surface is important, and, in order to realize the surface orientation of $R^f$ groups, it is necessary that the melting point of fine crystals in the polymer, derived from $R^f$ groups, exists. For this purpose, an $R^f$ group-containing monomer (crystalline $R^f$ group-containing monomer) having a melting point of fine crystals derived from $R^f$ groups, has been used.

This crystalline $R^f$ group-containing monomer achieves the purpose with a view to developing the water and oil repellency, and improvements have been made in other practical functions. For example, an improvement has been made such that in order to improve the durability against e.g. washing, dry cleaning and abrasion, a monomer for providing high hardness or a monomer having a crosslinking reactive group is employed in addition to the crystalline $R^f$ group-containing monomer, or the copolymer obtained is blended with a polymer having high coating film strength.

On the other hand, with respect to a copolymer (crystalline polymer) containing polymerized units of a crystalline $R^f$ group-containing monomer, an investigation has been made to soften the hard hand, or to lower the melting point of $R^f$ groups in order to develop the water repellency under the low temperature curing condition. For example, a case is known wherein a monomer containing a perfluoroalkyl group (hereinafter, a perfluoroalkyl group will be referred to as an $R^F$ group) having a wide range of chain length, is copolymerized with an alkyl group-containing monomer. Further, in the same manner, a method is known which uses a silicone containing an $R^F$ group having a wide range of chain length.

For example, JP-A-7-173025 (cosmetic composition containing a fluorine type compound and a wax having a specific melting point), JP-A-10-237133 (tetrapolymer comprising $R^F$ group (meth)acrylate, stearyl (meth)acrylate and other two types of monomers as essential components), JP-A-10-81873 (mixture of a fluorine type water and oil repellent, and an alcohol having an $R^F$ group having a specific chain length or a perfluoropolyether group-containing alcohol) and JP-A-8-109580 (reacted product of an amino group-containing silicone and an $R^f$ group-containing ester compound) may be mentioned as known art.

Meanwhile, as an example of limiting the chain length of an $R^f$ group-containing monomer to be used, JP-A-62-179517 (acryl type heptapolymer wherein the chain length distribution of $R^f$ groups is defined) may, for example, be mentioned, but it contains at least 40% of crystalline $R^f$ group-containing monomers.

Further, there has been a problem that on a surface treated with a water and oil repellent having a crystalline polymer as an active component, the bonding property and the hand are not satisfied at the same time. Namely, even when bonding treatment is attempted to impart various functions on the surface of fiber products treated with a water and oil repellent containing a crystalline polymer, for example, even when it is attempted to bond a film laminate or a seam tape to impart a water proofing property, or even when it is attempted to bond a urethane or acrylic resin to impart moisture permeability and water proofing property, it has been difficult to secure a sufficient bonding property since the crystalline Rf groups impair the bonding property. It has been tried to improve the bonding property by using a copolymer of a crystalline $R^f$ group-containing monomer and a specific monomer such as vinyl chloride. However, this method tends to further harden the hand of fibers, and thus, the bonding property and the hand have not been satisfied at the same time.

In the techniques of this field represented by these known art references, the physical properties are improved from a viewpoint of functions required in addition to the water and oil repellency, without impairing the water repellency and oil repellency attributable to $R^f$ groups. However, since the $R^f$ group-containing crystal polymer is used as the main component, the following demerits resulting therefrom have not been fundamentally overcome.

In conventional water and oil repellents, in order to achieve both of imparting of the water and oil repellency and imparting of the durability, it has been considered essential to use a crystalline $R^f$ group-containing monomer wherein the melting point derived from fine crystals of $R^f$ groups, is high (usually at least 70° C.), among crystalline $R^f$ group-containing monomers.

However, if the crystalline $R^f$ group-containing monomer is used, the entire polymer will have high crystallinity derived therefrom, and accordingly, an object coated or treated with such a polymer becomes very hard. For example, in the case of e.g. fiber products which should naturally be flexible, their flexible hand may be impaired, or since the coating film is hard and brittle, a defect such as a hand mark or a chalk mark formed during handling of the object, tends to remain on the whole cloth as the final product.

Further, there has been a demerit that a high water and oil repellency may be developed in the initial stage after the treatment, such performance tends to be extremely deteriorated by abrasion during the usage or by repeated washing. Namely, a water and oil repellent which can maintain the initial performance stably, has been desired. Further, on the coating film, shortage in the bonding property of the surface, or cracks or fractures which deteriorate the quality of the object tend to result, and therefore, it has been desired to overcome such problems so that this type of water and oil repellent can be applied to a wider range of materials.

Further, when a crystalline polymer is used as the main component, in order to obtain a uniform coating film having high water and oil repellency, usually, a process has been essential wherein after the coating, a high temperature treatment at a temperature higher than the melting point of fine crystals, is applied to melt the polymer, followed by cooling to form the film. However, if such a high temperature treatment is applied, there has been a case where a problem such as deterioration of color fastness, hardening of the hand or a fading, is induced and the quality of treated objects is further deteriorated, in the case of fiber products made of materials such as extrafine-denier fibers or modified cross-section fiber.

Heretofore, in order to solve the problems of crystalline polymers, such a technique as lowering the crystallinity of the polymers, or making the polymers flexible, is known. Further, for the purpose of forming a film at a low temperature, such a technique as using a film-forming auxiliary agent, or copolymerizing a polymerizable monomer containing a branched alkyl group having an internal practicizing effect, with a crystalline $R^f$ group-containing monomer, is known. However, in such a case, since the crystals derived from $R^f$ groups to develop water and oil repellency, are partially destroyed, there has been a problem such as developing no adequate water and oil repellency, or deterioration of the durability.

DISCLOSURE OF THE INVENTION

The present inventors have made detailed studies with respect to a totally new mechanism for developing water and oil repellency. And it has been astonishingly found that by combining an $R^f$ group-containing monomer which has not been used in the field of water repellent coating since the melting point attributable to the fine crystals of $R^f$ groups in its homopolymer does not exist or is low, with a crystalline hydrocarbon type monomer whose homopolymer does not develop water and oil repellency, the crystallinity attributable to the crystalline hydrocarbon type monomer can be strengthened. Namely, it has been found that by a synergistic effect of strengthening the surface orientation, the water and oil repellency can be developed even if fine crystals derived from $R^f$ groups in the polymer do not exist, or even if the melting point of such fine crystals is low.

In the water and oil repellent based on this principle, fine crystals derived from $R^f$ groups in the polymer do not exist or the melting point thereof is not high. Accordingly, the water and oil repellency can be imparted to objects without accompanying deterioration of the quality due to e.g. hardening of the hand or embrittlement of the coating film, which has been a conventional problem. Further, sufficient water and oil repellency can be imparted even if a treated object is treated at a temperature lower than before. Further, the deterioration of the performance is less even by e.g. abrasion or washing.

The present invention provides a water and oil repellent composition essentially containing a copolymer consisting essentially of polymerized units of the following monomer (a) and polymerized units of the following monomer (b):

monomer (a): a monomer having an $R^f$ group, wherein the melting point of fine crystals derived from the $R^f$ groups in a homopolymer of said monomer, does not exist or is at most 50° C., monomer (b): a monomer having an organic group other than an $R^f$ group, wherein the melting point of fine crystals derived from the organic groups in a homopolymer of said monomer, is at least 30° C.

In the present invention, it is important to contain polymerized units of monomer (a) (hereinafter, it may be referred to as an $R^f$ monomer) wherein the melting point of fine crystals derived from $R^f$ groups of the homopolymer does not exist or is at most 50° C. Further, in the present invention, it is also important to contain polymerized units of monomer (b) having an organic group other than an $R^f$ group, which is copolymerizable with the $R^f$ monomer, and wherein the melting point of fine crystals derived from the organic groups in its homopolymer, is at least 30° C. The copolymer of the $R^f$ monomer and monomer (b) is substantially essential in the present invention.

BEST MODE FOR CARRYING OUT THE INVENTION

Monomer (a) used in the present invention, may be a mixture of at least two types of $R^f$ monomers.

The presence or absence of the melting point of fine crystals derived from $R^f$ groups, can be confirmed by a differential calorimetry (a DSC measurement method described in JIS-K-7121-1987 and K-7122-1987). In the case of this method, when the calorie accompanying to the melting or solidification of the fine crystals is at most 3 kJ/mol, it is judged that the $R^f$ group-containing polymer do not contain fine crystals.

The presence or absence of fine crystals derived from $R^f$ groups can be confirmed also by observing a peak attributable to their self packing by means of a wide angle or small angle X-ray scattering. If the fine crystals are present in the polymer, usually the spacing of their characteristic packing planes is observed to be about 5 Å.

The $R^f$ monomer means a compound having an R group and a polymerizable unsaturated group. The $R^f$ monomer is preferably a compound represented by the formula $(Z-Y)_nX$ wherein an $R^f$ group Z and a polymerizable unsaturated group X are bonded to each other via a specific bivalent organic group Y. Here, Z is an $R^F$ group having a number of carbon atoms of at most 6, or a group represented by the formula $C_mF_{2m+1}O(CF_2CF(CF_3)O)_dCF(CF_3)$— (m is an integer of from 1 to 6, and d is an integer of from 1 to 4), n is 1 or 2, and when n is 2, two (Z–Y) may be the same or different from each other. X may be —CR=CH$_2$, —COOCR=CH$_2$, —OCOCR=CH$_2$, —OCH$_2$—φ—CR=CH$_2$ or —OCH=CH$_2$ when n is 1, and may be =CH(CH$_2$)$_q$CR=CH$_2$, =CH(CH$_2$)$_q$COOCR=CH$_2$, =CH(CH$_2$)$_q$OCOCR=CH$_2$ or —OCOCH=CHCOO— (R is a hydrogen atom, a methyl group or a halogen atom, φ is a phenylene group, and q is an integer from 0 to 4) when n is 2. Further, Y is a bivalent organic group or a single bond.

The $R^f$ group is a group having a part or all of hydrogen atoms of an alkyl group substituted by fluorine atoms, and its carbon number is preferably from 1 to 20. The $R^f$ group is preferably a group having at least from 20 to 80% in number of hydrogen atoms of an alkyl group substituted by fluorine atoms. Further, a part or all of the remaining hydrogen atoms may be substituted by chlorine atoms. The $R^f$ group may be of linear type or branched type. In the case of branched type, one having a short branch at the end far from the connecting bond or in the vicinity of the end, is preferred.

Among the above-mentioned preferred $R^f$ groups, a linear $R^F$ group represented by the formula $F(CF_2)_k$— (k is an integer of from 1 to 20), or a group represented by the formula $C_jF_{2j+1}(CM^1M^2CM^3M^4)_i$— ($M^1$, $M^2$, $M^3$ and $M^4$ are each independently a hydrogen atom, a fluorine atom or a chlorine atom, and one of them is a fluorine atom, and j and i are each an integer of at least 1 and satisfy $20 \geq (j+2\times i) \geq 6$), is preferred. Particularly, an $R^F$ group having a carbon number of at most 6, or a group represented by the formula $C_mF_{2m+1}O(CF_2CF(CF_3)O)_dCF(CF_3)$— (m is an integer of from 1 to 6, and d is an integer of from 1 to 4), is preferred.

The carbon number of the $R^f$ group is preferably from 1 to 20, particularly preferably from 1 to 12. One having a small carbon number is preferred since fine crystals derived from the $R^f$ groups are not likely to be formed when the homopolymer is formed, and the copolymer can form a flexible film. The $R^f$ group may be a linear polyfluorohydrocarbon group having at least one unsaturated group such as carbon—carbon unsaturated double bond.

The $R^f$ group may be a polyfluorooxaalkyl group having a part of its carbon atoms substituted by etheric oxygen atoms. Particularly, a polyfluorooxaalkyl group (particularly, a perfluorooxaalkyl group) having at least one perfluorooxypropylene group, is preferred. The carbon number in this case is preferably from 6 to 18 including carbon atoms before substituted by oxygen atoms.

A specific $R^f$ group may be one of the following $R^f$ groups, but is not limited thereto:

$F(CF_2)_4$—, $F(CF_2)_5$—, $F(CF_2)_6$—, $(CF_3)_2CF(CF_2)_2$—, $H(CF_2)_6$—, $HCF_2CF_2$—, $Cl(CF_2)_4$—, $F(CF_2)_4(CH_2CF_2)_3$—, $F(CF_2)_6(CH_2CF_2)_3$—, $F(CF_2)_4(CFClCF_2)_2$—, $CF_3CF=CFCF_2CF=CF$—, $CF_3CF_2C(CF_3)$—$CH(CF_3)(CF_2CF_3)$, $C_eF_{2e+1}O[CF(CF_3)CF_2O]_h$—$CF(CF_3)$— or $C_3F_7O[CF(CF_3)CF_2O]_h(CF_2)_v$— (e is an integer of from 3 to 6, h is an integer of from 0 to 3, and v is an integer of from 2 to 6).

The $R^f$ group and the polymerizable unsaturated group may be bonded by a single bond or via a bivalent organic group. As the bivalent organic group, a group containing an alkylene group is preferred. The alkylene group may be linear or one having a branch. Further, in the bivalent organic group, e.g. —O—, —NH—, —CO—, —SO$_2$— or —CD$^1$=CD$^2$— (D$^1$ and D$^2$ each independently represents a hydrogen atom or a methyl group) may be contained. As the bivalent organic group, an alkylene group is preferred.

As Y, a bivalent organic group represented by the formula —R$^M$-Q—R$^N$— (R$^M$ and R$^N$ each independently represents a single bond or a saturated or unsaturated hydrocarbon group having a carbon number of from 1 to 22 which may contain at least one oxygen atom, and Q represents a single bond, —OCONH—, —CONH—, —SO$_2$NH— or —NHCONH—) is preferred.

As Y, —CH$_2$—, —CH$_2$CH$_2$—, —(CH$_2$)$_{11}$—, —CH$_2$CH$_2$CH(CH$_3$)—, —CH=CHCH$_2$—, —(CH$_2$CHR$^2$O)$_w$CH$_2$CH$_2$— (w is an integer of from 1 to 10, and R$^2$ represents a hydrogen atom or a methyl group), —C$_2$H$_4$OCONHC$_2$H$_4$—, —C$_2$H$_4$OCOOC$_2$H$_4$— or —COOC$_2$H$_4$— may, for example, be preferably mentioned.

As X, an ethylenic polymerizable unsaturated group, namely, e.g. a residue of an olefin, a residue of a vinyl ether, a residue of a vinyl ester, a residue of a (meth)acrylate, a residue of a maleic acid ester or a residue of a fumaric acid ester, is preferred. Here, the residue of an olefin means a group represented by —CR=CH$_2$, the residue of a vinyl ester means a group represented by —COOCR=CH$_2$, the residue of a vinyl ether means a group represented by —OCR=CH$_2$, the residue of a (meth)acrylate means a group represented by —OCOCR=CH$_2$, and the residue of a maleic acid or fumaric acid ester means a group represented by —OCOCH=CHCOO—. In addition to these, —OCH$_2$-φ-CR=CH$_2$ and —OCH=CH$_2$ may, for example, be mentioned (φ represents a phenylene group).

Here, R is preferably a hydrogen atom, a halogen atom (a fluorine atom, a chlorine atom, etc.) or a short-chain alkyl group having a carbon number of from 1 to 3 (particularly a methyl group), in order not to hinder polymerization. In consideration of the polymerizability to form a copolymer, X is preferably a residue of a (meth)acrylate, or a residue of maleic acid or fumaric acid ester, and from the viewpoint of e.g. the solubility in the solvent or easiness of emulsion polymerization, the residue of a (meth)acrylate is particularly preferred.

As the $R^f$ monomer, particularly a (meth)acrylate having an $R^f$ group is preferred. As such an $R^f$ monomer, various monomers such as the following monomer (a) may be used. As such monomers, known monomers may be used. As the monomer (a) employed in the present invention, a (meth)acrylate is particularly preferred as mentioned above from the viewpoint of e.g. the polymerizability with other monomers, flexibility of the film to be formed, adhesion to the substrate, solubility in the solvent and easiness of emulsion polymerization.

In a case of a (meth)acrylate where the $R^f$ group is an $R^F$ group, and Y is —(CH$_2$)—, —(CH$_2$CH$_2$)— or —(CH$_2$)$_3$—, if the carbon number is at least 7, the melting point of fine crystals will be present and the objective function will not be developed, and such a monomer is excluded from the monomer (a) to be employed in the present invention. In such a case, the $R^f$ group is preferably an $R^F$ group having a carbon number of at most 6. And, it is most preferably a linear $R^F$ group having a carbon number of from 4 to 6.

When Y is —CH$_2$CH$_2$CH(CH$_3$)— or —CH=CH—CH$_2$— and X is a (meth)acrylate, the carbon number of the $R^f$ group is preferably from 1 to 10, particularly preferably from 4 to 8. When the $R^f$ group is a polyfluoropolyether group containing an oxygen, and X is a (meth)acrylate, the carbon number of the $R^f$ group is preferably from 4 to 18.

As the monomer (b) of the present invention, a (meth)acrylate, a vinyl ether or a vinyl ester may preferably be mentioned. The monomer (b) may contain a small number of isolated fluorine atoms which are usually not regarded as $R^f$ groups. Further, as an organic group contained in the monomer (b), a long-chain hydrocarbon group wherein the melting point of fine crystals is at least 30° C., is preferred.

As the monomer (b) having a long-chain hydrocarbon group, a monomer having a linear hydrocarbon group having a carbon number of at least 14, particularly a monomer having a linear saturated alkyl group having a carbon number of from 16 to 24, is preferred. As the monomer (b), a (meth)acrylate containing a saturated hydrocarbon group having a carbon number of at least 15, is particularly preferred. Further, a vinyl ester containing a saturated hydrocarbon group having a carbon number of at least 15, is also preferred.

The molar ratio of polymerized units of monomer (a)/polymerized units of monomer (b) in the copolymer is preferably from 0.1/1 to 9/1, more preferably from 0.2/1 to 5/1, particularly preferably from 0.2/1 to 1.5/1. The composition in this range is excellent in the water and oil repellency and in the flexibility of the film, such being preferred. Further, the copolymer may contain a monomer (also referred to as another monomer) other than the monomer (a) and the monomer (b), for the purpose of improving physical properties other than the water and oil repellency, such as the adhesion to a substrate, the bonding property, and the durability against abrasion.

Another monomer may, for example, be ethylene, vinylidene chloride, vinyl chloride, vinylidene fluoride, vinyl acetate, styrene, α-methylstyrene, p-methylstyrene, glycidyl (meth)acrylate, (meth)acrylamide, N,N-dimethy (meth)acrylamide, diacetone(meth)acrylamide, methyloldiacetone(meth)acrylamide, N-methylol(meth) acrylamide, vinyl alkyl ether, an alkyl vinyl ether halide, a vinyl alkyl ketone, butadiene, isopropylene, chloroprene, aziridinylethyl (meth)acrylate, benzyl (meth)acrylate, aziridinyl (meth)acrylate, a polyoxyalkylene (meth)acrylate, a methylpolyoxyalkylene (meth)acrylate, a 2-ethylhexylplyoxyalkylene (meth)acrylate, a polyoxyalkylene di(meth)acrylate, a (meth)acrylate having polysiloxane, triallyl cyanurate, allylglycidyl ether, allyl acetate, N-vinylcarbazole, maleimide, N-methylmaleimide, (2-dimethylamino)ethyl (meth)acrylate, a (meth)acrylate having an alkyl group having a carbon number of from 8 to 20, a cycloalkyl (meth)acrylate, hydroxyethyl (meth) acrylate, glycerol (meth)acrylate, a (meth)acrylate having a silicone in its side chain, a (meth)acrylate having an urethane bond, an alkylenedi(meth)acrylate or polyoxyalkylene di(meth)acrylate.

Particularly, vinyl chloride, a hydroxyethyl (meth) acrylate having a reactive group such as a hydroxyl group in its molecule, a polyoxyalkylene (meth)acrylate, a methylpolyoxyalkylene (meth)acrylate, a glycidyl (meth) acrylate, a bifunctional polyoxyethylene di(meth)acrylate, ethyleneglycoldi(meth)acrylate or a blocked isocyanate ethyl (meth)acrylate, is preferred with a view to improving the adhesion to a substrate, of the composition including the copolymer.

In the water and oil repellent composition of the present invention, the method of preparing the copolymer to be the active component, is not particularly limited. For example, a common polymerization method such as a solution polymerization method using an organic solvent, a dispersion polymerization method using water as a dispersion medium and containing a nonionic surfactant and/or a cationic surfactant, or an emulsion polymerization method, may be employed. The obtained solution, dispersion or emulsion of the copolymer may be used as it is, or may be used as diluted. Otherwise, the copolymer may be isolated, and then, dissolved, dispersed or emulsified in a solvent, dispersion medium or emulsion medium.

The form of the water and oil repellent composition is preferably an aqueous dispersion containing a small amount of a surfactant and/or an organic solvent considering the easiness in handling. Further, various additives such as a penetrant, a defoaming agent, a water absorbent, an antistatic agent, an anticrease agent, a hand adjusting agent, a film-forming auxiliary agent, a water soluble polymer such as polyacrylamide or polyvinyl alcohol, a melamine resin or a urethane resin, may be incorporated to the composition, as the case requires.

The water and oil repellent composition of the present invention is useful for a water and oil repellent treatment of e.g. working cloths or uniforms. Further, it is also useful for an application as a coating agent for filtration materials to be used in the presence of an organic solvent liquid or its vapor, as a surface protecting agent, as a coating agent for electronics or as an antifouling coating agent.

When an object is treated with the water and oil repellent composition of the present invention, if the object is a fiber product, the hand becomes flexible since the coating film is flexible, and high quality water and oil repellency can be imparted to the object. Further, since the fine crystals derived from $R^f$ groups are not contained, the composition is excellent in the bonding property of the surface, and can impart water and oil repellency even by curing at a low temperature. Further, the deterioration in performance by abrasion or by washing is less, and accordingly the performance of initial treatment can be maintained stably. Further, when paper is treated with the composition, an excellent sizing property, water repellency and oil repellency can be imparted to the paper even under low temperature short drying conditions.

There is no particular restriction as to the object to be treated with the water and oil repellent composition of the present invention, and it may, for example, be a fiber product made of e.g. a natural fiber, a synthetic fiber or a blended fiber thereof, a metal, a glass, a resin, a paper or a leather.

EXAMPLES

Now, the present invention will be described more specifically with reference to Examples of the present invention (Examples 1 to 13 and 19 to 21) and Comparative Examples (Examples 14 to 18). However, the present invention is not limited thereto.

Example 1

Into a 100 ml polymerization ample made of glass, 8.1 g of $C_4F_9CH_2CH_2OCOCH=CH_2$ (there is no melting point of fine crystals in the homopolymer, and this will be hereinafter referred to as C4FA), 12.3 g of stearyl acrylate (the melting point of fine crystals in the homopolymer is 42° C., and this will be hereinafter referred to as STA), 0.4 g of hydroxyethyl acrylate (hereinafter referred to as HEA), 0.3 g of polyoxyalkyleneglycol monomethacrylate (its polyoxyalkylene portion has a structure such that 3 mol of propylene oxide and 7 mol of ethylene oxide are added, and this will be hereinafter referred to as PAGM), 1.7 g of polyoxyethylene octylphenyl ether (hereinafter referred to as PEOP), 0.4 g of stearyl triethylammonium chloride (hereinafter referred to as STEA), 26.2 g of water, 10.5 g of acetone, 0.1 g of stearyl mercaptan (hereinafter referred to as STM) being a molecular weight-control agent and 0.04 g of 2,2'-azobis(2-methylpropione amidine) dihydrochloride (hereinafter referred to as ABMA) being an initiator, were put.

Then, nitrogen substitution was carried out, and a polymerizing reaction was carried out at 55° C. for 12 hours to obtain an emulsion having a solid content concentration of 38.1%. The emulsion obtained was washed twice with methanol and subjected to vacuum drying at 30° C. overnight to obtain a polymer. The melting point of fine crystals of the polymer obtained was 37.2° C.

Example 2

Into a 100 ml polymerization ample made of glass, 4.1 g of C4FA, 16.2 g of behenyl acrylate (the melting point of fine crystal of the homopolymer is 57° C.), 0.4 g of HEA, 0.3 g of PAGM, 0.1 g of ethyleneglycol dimethacrylate, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 60° C. for 12 hours to obtain an emulsion having a solid content concentration of 38.8%. The emulsion obtained was washed twice with methanol and subjected to vacuum drying at 30° C. overnight to obtain a polymer. The melting point of fine crystals of the polymer obtained was 55.2° C.

Example 3

Into a 100 ml polymerization ample made of glass, 4.1 g of C4FA, 16.2 g of cetyl acrylate, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 37.4%. The emulsion obtained was washed twice with methanol and subjected to vacuum drying at 30° C. overnight to obtain a polymer. The melting point of fine crystals of the polymer obtained was 27.3° C.

Example 4

Into a 100 ml polymerization ample made of glass, 8.1 g of $C_6F_{13}CH_2CH_2OCOCH=CH_2$ (there is no melting point of fine crystals of the homopolymer, and this will be hereinafter referred to as C6FA), 12.2 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 31.8%. The emulsion obtained was washed twice with methanol and subjected to a vacuum drying at 38° C. overnight to obtain a polymer. The melting point of fine crystals of the polymer obtained was 38.4° C.

Example 5

Into a 1,000 ml reactor made of glass having a stirring vane, 55.6 g of C4FA, 88 g of STA, 13 g of dioctylmaleate, 5.5 g of N-methylol acrylamide, 2 g of a polyethyleneoxide-polypropyleneoxide polymer, 7.4 g of polyoxyethyleneoleyl ether, 0.8 g of acetyleneglycol ethylene oxide 30 mol adduct, 0.8 g of acetyleneglycol ethylene oxide 10 mol adduct, 296.4 g of water, 82 g of acetone and 0.6 g of STM, were put.

They were preliminarily dispersed at 55° C. for 1 hour, and then subjected to treatment using a high pressure homogenizer (emulsifier LAB60-10TBS, manufactured by Gaulin) under a pressure of 200 kg/cm$^2$ to obtain an emulsion. The emulsion obtained was put in a 1,000 ml autoclave made of stainless steel, followed by nitrogen substitution. In this emulsion, 43 g of vinyl chloride was incorporated, and then 2.2 g of 2,2'-azobis[2-(2-imidazolin-2-yl)]propane was incorporated, followed by a polymerizing reaction at 55° C. for 8 hours, to obtain a emulsion having a solid content concentration of 32.5%. The emulsion obtained was washed twice with methanol and subjected to vacuum drying at 30° C. overnight to obtain a polymer. The melting point of fine crystals of the polymer obtained was 32° C.

Example 6

Into a 100 ml polymerization ample made of glass, 8.5 g of C6FA, 11.7 g of behenyl acrylate, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 60° C. for 12 hours to obtain an emulsion having a solid content concentration of 38.1%. The emulsion obtained was washed twice with methanol and subjected to vacuum drying at 30° C. overnight to obtain a polymer. The melting point of fine crystals of the polymer obtained was 56.8° C.

Example 7

Into a 500 ml reactor made of glass having a stirring vane, 51.2 g of C6FA, 70.4 g of STA, 2.5 g of HEA, 1.8 g of PAGM, 10.1 g of PEOP, 2.5 g of STEA, 157.2 g of water, 63 g of acetone and 0.7 g of STM, were put.

Then, they were preliminarily dispersed at 50° C. for 30 minutes and then subjected to treatment using a high pressure homogenizer (emulsifier, manufactured by Gaulin) under a pressure of 200 kg/cm$^2$ to obtain a emulsion. The emulsion obtained was put in a 500 ml autoclave made of stainless steel, followed by nitrogen substitution. In this emulsion, 4.8 g of vinyl chloride was incorporated, and then, 0.2 g of ABMA was incorporated, followed by a polymerizing reaction at 55° C. for 12 hours to obtain an emulsion having a solid content concentration of 38.6%. The emulsion obtained was washed twice with methanol and subjected to vacuum drying at 30° C. overnight to obtain a polymer. The melting point of fine crystals of the polymer obtained was 39° C.

Example 8

Into a 100 ml polymerization ample made of glass, 13.8 g of $C_4F_9CH_2CH_2OCOC(CH_3)=CH_2$ (there is no melting point of fine crystals of the homopolymer), 6.2 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 38.4%. The emulsion obtained was washed twice with methanol and subjected to vacuum drying at 30° C. overnight to obtain a polymer. The melting point of fine crystals of the polymer obtained was 35.6° C.

Example 9

Into a 100 ml polymerization ample made of glass, 2.6 g of C4FA, 6.0 g of C6FA, 11.7 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 37.8%. The emulsion obtained was washed twice with methanol and subjected to vacuum drying at 30° C. overnight to obtain a polymer. The melting point of fine crystals of the polymer obtained was 37.8° C.

Example 10

Into a 100 ml polymerization ample made of glass, 8.7 g of $C_3F_7O(CF_2CF(CF_3)O)_2CF(CF_3)CH_2OCOCH=CH_2$ (there is no melting point of fine crystals of the homopolymer), 11.5 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 39.2%. The emulsion obtained was washed twice with methanol and subjected to vacuum drying at 30° C. overnight to obtain a polymer. The melting point of fine crystals of the polymer obtained was 38° C.

Example 11

Into a 1 l beaker made of glass, 256.3 g of C4FA, 1.4 g of hydroxyethyl methacrylate, 16.5 g of 2-isocyanate ethyl methacrylate wherein the isocyanate group is blocked by 3,5-dimethylpyrazole, 3.6 g of n-dodecylmercaptan, 7.4 g of polyoxyethylene oleyl ether (average added mole number of ethylene oxide is 30), 2.5 g of a polyoxyethylene-polyoxypropylene block copolymer, 2.5 g of stearyl trimethyl ammonium chloride (purity: 63%), 108 g of dipropylene glycol, 389.9 g of deionized water and 1.1 g of acetic acid, were put.

This beaker was put in a hot water bath of 50° C. for warming, and the content was mixed by using a homomixer (T. K. Homo Mixer MK2, manufactured by Tokushu Kika Kogyo Co., Ltd.) to obtain a mixed solution. The mixed solution was maintained at 50° C. and subjected to treatment by using a high pressure homogenizer (emulsifier LAB60-10TBS, manufactured by Gaulin) under a pressure of 40 MPa, to obtain a emulsion. 698.8 g of the emulsion obtained was put into a 1 l autoclave and cooled to a temperature of at most 30° C. The vapor phase was substituted by nitrogen and 1.4 g of 2,2'-azobis[2-(2-imidazoline-2-il)propane] was incorporated, followed by a polymerizing reaction at 60° C. for 8 hours with stirring, to obtain emulsion A having a solid content concentration of 34.3%.

Emulsion B having a solid content concentration of 34.1% was obtained in the same manner as obtaining emulsion A except that in the process of preparing emulsion A, as the monomer composition, 93.2 g of C4FA, 2.7 g of hydroxyethyl methacrylate, the same amount of 2-isocyanate ethyl methacrylate wherein the isocyanate group is blocked by 3,5-dimethylpyrazole, and additionally 161.8 g of STA, were used.

Emulsion A and emulsion B were each diluted by deionized water so that its solid content concentration becomes 20%, and the emulsion A and the emulsion B were mixed at a mass ratio of 2 to 1. The emulsion obtained was washed twice with methanol and subjected to vacuum drying at 30° C. overnight to obtain a polymer. The melting point of fine crystals of the polymer obtained was 37° C.

Example 12

Emulsion C and emulsion D were obtained in the same manner as in Example 11 except that C6FA was employed instead of C4FA. The solid content concentration of the emulsion C was 33.9%, and the solid content concentration of the emulsion D was 34.2%.

With respect to the emulsion C and the emulsion D, a polymer was obtained in the same manner as in Example 11. The melting point of fine crystals of the polymer obtained was 37.4° C.

Example 13

Into a 100 ml polymerization ample made of glass, 8.1 g of a mixture of $(C_4F_9C_2H_4)_2CHOCOCH=CH_2$ (13a), $C_4F_9C_2H_4(C_4F_9)CHC_2H_4OCOCH=CH_2$ (13b) and $C_4F_9C_2H_4(C_4F_9CH_2)CHCH_2OCOCH=CH_2$ (13c) (the mass ratio of 13a:13b:13c is 4:3:3, and there is no melting point of fine crystals of the homopolymer of each of these compounds), 12.3 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 38.3%. The emulsion obtained was washed twice with methanol and subjected to vacuum drying at 30° C. overnight to obtain a polymer. The melting point of fine crystals of the polymer obtained was 37° C.

Example 14

Into a 100 ml polymerization ample made of glass, 1.8 g of C4FA, 4.3 g of C6FA, 2.6 g of $C_{10}F_{21}CH_2CH_2OCOCH=CH_2$, 11.5 g of STA, 0.4 g of HEA, 0.3 g of PAGM, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 37.9%. The emulsion obtained was washed twice with methanol and subjected to vacuum drying at 30° C. overnight to obtain a polymer. The melting points of fine crystals of the polymer obtained were 43.4° C. and 90.1° C.

Example 15

Into a 100 ml polymerization ample made of glass, 21.2 g of C4FA, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 38.2%. The emulsion obtained was washed twice with methanol and subjected to vacuum drying at 30° C. overnight to obtain a polymer. The melting point of fine crystals of the polymer obtained was not observed.

Example 16

Into a 100 ml polymerization ample made of glass, 21.2 g of STA, 1.7 g of PEOP, 0.4 g of STEA, 26.2 g of water, 10.5 g of acetone, 0.1 g of STM and 0.04 g of ABMA were put.

Then, nitrogen substitution was carried out and a polymerizing reaction was carried out at 55° C. for 12 hours to obtain an emulsion having a solid content concentration of 38.8%. The emulsion obtained was washed twice with methanol and subjected to vacuum drying at 30° C. overnight to obtain a polymer. The melting point of fine crystals of the polymer obtained was 43° C.

Example 17

Into a 100 ml polymerization ample made of glass, 21.2 g of behenyl acrylate, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 60° C. for 12 hours to obtain an emulsion having a solid content concentration of 39.5%. The emulsion obtained was washed twice with methanol and subjected to vacuum drying at 30° C. overnight to obtain a polymer. The melting point of fine crystals of the polymer obtained was 58° C.

Example 18

Into a 100 ml polymerization ample made of glass, 8.7 g of $C_gF_{2g+1}CH_2CH_2OCOCH=CH_2$ (g is 9 as an average, the melting point of fine crystals of the homopolymer is 78° C.), 13.2 g of STA, 0.4 g of HEA, 0.3 g of PAGM, 0.1 g of ethyleneglycol dimethacrylate, 1.7 g of PEOP, 0.4 g of STEA, 26.2 g of water, 10.5 g of acetone, 0.1 g of STM and 0.04 g of ABMA, were put.

Then, nitrogen substitution was carried out and a polymerizing reaction was carried out at 55° C. for 12 hours to obtain an emulsion having a solid content concentration of 38.1%. The emulsion obtained was washed twice with methanol and subjected to vacuum drying at 30° C overnight to obtain a polymer. The melting points of fine crystals of the polymer obtained were 39.5° C. and 62° C.

Preparation of Test Cloth

Using the emulsions obtained in Examples 1 to 18, test cloths were prepared by the following method to evaluate the water repellency, oil repellency and washing durability (HL5). The results are shown in Table 3. Further, the hand, softness, bonding property (peel strength) were also evaluated by the following methods. The results are shown in Table 4.

Each of the emulsions obtained was diluted by deionized water so that the solid content concentration became 2%, and trimethylol melamine and an organic amine salt catalyst (ACX, tradename, manufactured by Sumitomo Chemical Co., Ltd.) were incorporated to have a concentration of 0.3 mass %, to obtain test liquids. Polyester cloths were coated with these test liquids by means of dip coating, and squeezed so that the wet pickup became 90 mass %. They were either dried at 85° C. for 180 seconds (hereinafter referred to as low temperature treatment) or dried at 110° C. for 90 seconds followed by drying at 170° C. for 60 seconds (hereinafter referred to as high temperature treatment) to prepare two types of test cloths.

Evaluation of Water Repellency

This is represented by the water repellency number (refer to Table 1) obtained by the spray method according to JIS L-1092. Here, an evaluation result represented by the following water repellency number followed by + indicates that each of the evaluation is slightly better than the figure, and − indicates that it is slightly lower. The results were summarized in Table 3.

TABLE 1

| Water repellency number | State |
|---|---|
| 100 | No wettability observed on the surface |
| 90 | Slight wettability observed on the surface |
| 80 | Partial wettability observed on the surface |
| 70 | Wettability observed on the surface |
| 50 | Wettability observed over the entire surface |
| 0 | Complete wettability observed both front and back surfaces |

Evaluation of Oil Repellency

The evaluation was carried out according to AATCC-TM188-1966, and the results were represented by the oil repellency numbers as defined in Table 2. The results are summarized in Table 3.

TABLE 2

| Oil repellency number | Test solution | Surface tension mN/m (25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | nujol 65 parts/ hexadecane 35 parts | 29.6 |

TABLE 2-continued

| Oil repellency number | Test solution | Surface tension mN/m (25° C.) |
|---|---|---|
| 1 | nujol | 31.2 |
| 0 | Less than 1 | — |

Evaluation of Washing Durability (HL5)

According to the water washing method of JIS-L0217 appendix Table 103, the washing was repeated five times using the test cloths subjected to the low temperature treatment, and they were dried at 75° C. for 5 minutes and the water repellency and oil repellency were evaluated.

Evaluation of Hand

It was evaluated by the feeling in touch and represented by four-stage evaluation standards i.e. ⊚: very soft, ○: soft, Δ: same or slightly harder than original cloth, and ×: harder than original cloth.

Evaluation of Softness

The emulsions obtained in Examples 1 to 18 were each diluted by deionized water so that the solid content concentration became 2 mass % to obtain test liquids for the evaluation of softness. Cotton cloths were each coated with these test liquids by dip coating, and squeezed to have a wet pickup of 90 mass %. They were dried at 110° C. for 90 seconds and further treated at 170° C. for 60 seconds. They were cut into a rectangle of 2 cm in lengthwise direction×10 cm in transverse direction to obtain test cloths for the softness evaluation.

The test cloth for the softness evaluation was placed on a horizontal bar (diameter: 3 mm, length: 50 mm) so that the center line of the long sides or short sides of the test cloth was aligned to the bar, and the distance between the pendent short sides (unit: mm) was measured. With respect to each of the test cloths having various cutting orientations; the distance between the long sides or between short sides was measured 5 times, and the average of these 10 measurements was calculated and used as the index for the softness. The smaller this number is, the more flexible the test cloth is.

Evaluation of Bonding Property (Peel Strength)

The emulsions obtained in Examples 1 to 18 were each diluted by deionized water so that the solid content concentration became 1.2 mass %, and a melamine resin (Sumitex Resin M3, tradename, manufactured by Sumitomo Chemical Co., Ltd.) and a catalyst (Sumitex Accelerator ACX, tradename, manufactured by Sumitomo Chemical Co., Ltd.) were each incorporated to the emulsion at a concentration of 0.3 mass %, to obtain a bonding property test liquid.

A nylon Taslan cloth subjected to dying and fixing treatment, was coated with the bonding property test liquid obtained, and the cloth was squeezed between two rubber rollers. This operation was repeated twice, and the cloth was squeezed so that the wet pickup became 90 mass %. Then, the cloth was dried at 100° C. for 60 seconds, and its temperature was further maintained at 150° C. for 60 seconds to obtain the test cloth for bonding property evaluation.

On the surface of the test cloth for bonding property evaluation thus obtained, a mixture of 100 parts of a DMF solution (resin concentration: 30 mass %) of a polyester type polyurethane resin comprising an adipate type polyester and DMI, and 1 part of hexamethylene diisocyanate, was applied in an amount of 100 g/m², by coating by a bar coater. Then, the test cloth was dipped in water having a temperature of 25° C. for 1 minute to coagulate the resin, and washed with hot water having a temperature of 50° C. for 5 minutes. This test cloth was maintained at 130° C. for 2 minutes to obtain a coated cloth.

A hot melt tape having a width of 2.5 cm and a length of 15 cm ("MELCO Tape", manufactured by Sun Chemical Corp.) was bonded by means of a transfer press (manufactured by Okuno Denki) at 150° C. for 30 seconds. Then, it was left under the condition of a temperature of 25° C. and a humidity of 60% for 72 hours. With respect to the cloth obtained, the bonding property between the nylon Taslan cloth and the polyurethane resin was measured by means of a tensile tester.

Then, nitrogen substitution was carried out and a polymerizing reaction was carried out for 15 hours with stirring at 300 rpm while maintaining the temperature at 60° C., to obtain an emulsion having a solid content concentration of 35.5%. The emulsion obtained was washed twice with methanol and subjected to vacuum drying at 30° C. overnight to obtain a polymer. The melting point of fine crystals of the polymer obtained was 36° C.

TABLE 3

| Example | Water repellency | | | Oil repellency | | |
|---|---|---|---|---|---|---|
| | Low temperature treatment | high temperature treatment | HL5 | Low temperature treatment | high temperature treatment | HL5 |
| 1 | 90+ | 90+ | 80 | 4 | 4 | 2+ |
| 2 | 80 | 80+ | 70 | 2+ | 2 | 1+ |
| 3 | 80+ | 80+ | 70 | 4 | 4 | 2 |
| 4 | 90+ | 100 | 80+ | 5+ | 6− | 4− |
| 5 | 100 | 90+ | 80+ | 2+ | 2+ | 1 |
| 6 | 90 | 90 | 80+ | 4 | 4 | 2 |
| 7 | 100 | 100 | 80+ | 5 | 5 | 3+ |
| 8 | 100 | 90+ | 80+ | 4 | 4+ | 2+ |
| 9 | 100 | 100 | 90 | 5 | 5 | 3 |
| 10 | 90+ | 90+ | 70 | 4+ | 4+ | 3− |
| 11 | 80 | 90− | 70 | 3− | 3 | 3 |
| 12 | 90− | 100 | 80+ | 5 | 5 | 5 |
| 13 | 90+ | 90+ | 80 | 4 | 4 | 2+ |
| 14 | 80+ | 100 | 50− | 3+ | 5 | 0 |
| 15 | 50 | 70− | 0 | 2 | 3+ | 0 |
| 16 | 70 | 80 | 0 | 0 | 0 | 0 |
| 17 | 50 | 70 | 0 | 0 | 0 | 0 |
| 18 | 80 | 100 | 50− | 3+ | 5− | 0 |

TABLE 4

| Example | Hand | Softness | Bonding property (N/cm) |
|---|---|---|---|
| 1 | ⊚ | 37 | 2.7 |
| 2 | ⊚ | 35 | 2.5 |
| 3 | ⊚ | 35 | 2.6 |
| 4 | ⊚ | 44 | 2.5 |
| 5 | ○ | 45 | 3.1 |
| 6 | ○ | 42 | 2.5 |
| 7 | ○ | 44 | 3.0 |
| 8 | ⊚ | 40 | 2.6 |
| 9 | ○ | 42 | 2.6 |
| 10 | ○ | 35 | 2.8 |
| 11 | ○ | 38 | 2.9 |
| 12 | ○ | 39 | 3.2 |
| 13 | ⊚ | 37 | 2.7 |
| 14 | ○ | 54 | 1.9 |
| 15 | Δ | 41 | 2.5 |
| 16 | Δ | 35 | 1.5 |
| 17 | Δ | 38 | 1.3 |
| 18 | Δ | 55 | 1.2 |

Example 19

Into a 1 l reaction vessel having a stirring vane, 92 g of C4FA, 84 g of STA, 103.6 g of vinylidene chloride, 2.7 g of N,N,N-trimethyl-N-(2-hydroxy-3-methcryloyloxypropyl) ammonium chloride ($CH_2$=$C(CH_3)COOCH_2CH(OH)CH_2N^+(CH_3)_3.Cl^-$), 13.3 g of polyoxyethylene polycyclic phenyl ether, 2.7 g of monooctadecyltrimethyl ammonium chloride, 398.4 g of deionized water, 119.5 g of dipropylene glycol monomethyl ether (DPGMME) and 0.5 g of azobisimidazoline propane, were put.

Example 20

An emulsion having a solid content concentration of 36.6% was obtained in the same manner as in Example 19 except that 42.4 g of C4FA was used and 64 g of C6FA was used in addition. The emulsion obtained was washed twice with methanol and subjected to vacuum drying at 30° C. overnight to obtain a polymer. The melting point of fine crystals of the polymer obtained was 36.2° C.

Example 21

An emulsion having a solid content concentration of 37.7% was obtained in the same manner as in Example 19 except that 121.3 g of C6FA was used instead of 92 g of C4FA. The emulsion obtained was washed twice with methanol and subjected to vacuum drying at 30° C. overnight to obtain a polymer. The melting point of fine crystals of the polymer obtained was 37.3° C.

Preparation of Processed Paper

The emulsions obtained in Examples 19 to 21 were each diluted by deionized water so that the solid content concentration became 0.9 mass % to obtain treatment baths. Non-sized paper (weight: 85g/m$^2$) was dipped in this treatment bath, and the pick-up was made to be 60 mass % by means of a size-press. Then, the paper was dried for 30 seconds by means of a drum dryer heated at 80° C. to obtain a processed paper. With respect to the processed paper obtained, the oil repellent degree, water repellent degree and sizing property were evaluated. The results are shown in Table 7.

Evaluation of Oil Repellent Degree on Processed Paper

Salad oil was dropped on the surface of the processed paper, and 30 seconds later, the judgment was made by visual observation as to whether or not the salad oil penetrated to the backside of the processed paper.

Evaluation of Water Repellent Degree on Processed Paper

The results were represented by the water repellent degrees as identified in Table 5 according to JIS P-8137.

TABLE 5

| Water repellent degree | Result |
| --- | --- |
| $R_0$ | A continuous trace having a uniform width |
| $R_2$ | A continuous trace having a width slightly narrower than a water droplet |
| $R_4$ | A continuous trace discontinuing place to place and having a width apparently narrower than a water droplet |
| $R_6$ | Half of the trace is wet |
| $R_7$ | ¼ of the trace is wet with elongated water drops |
| $R_8$ | Small spherical water droplets are scattered over at least ¼ of the trace |
| $R_9$ | Small spherical water droplets are scattered place to place |
| $R_{10}$ | Water droplets roll off completely. |

Evaluation of Sizing Degree

The Stockigt sizing degree (sec) was evaluated according to JIS-P-8122.

The larger the value, the more excellent in the sizing degree.

Preparation of Test Leather

The emulsions obtained in Examples 19 to 21 were each diluted by city water having a pH of 6, so that the solid content concentration became 4 mass %. 1 l of the emulsion after the dilution was put into a 3 l beaker, and a 200 mm square chrome-tanned leather was put in the emulsion and subjected to dipping treatment at 50° C. for 60 minutes. Subsequently, the leather was washed with water, dried, smoothed by a common method and then dried at 70° C. for 40 minutes to obtain the test leather. With respect to the test leather thus obtained, the water resistance was evaluated.

Evaluation of Water Resistance of Test Leather

The test leathers were each formed to have a bag shape, water was put therein, and 48 hours later, the penetration status of the water was visually observed. The results were shown in Table 6.

TABLE 6

| Example | Oil repellent degree | Water repellent degree | Sizing property | Water resistance |
| --- | --- | --- | --- | --- |
| 19 | No penetration | R8 | 20.3 | No water permeation |
| 20 | No penetration | R8 | 20.9 | No water permeation |
| 21 | No penetration | R9 | 22.8 | No water permeation |

INDUSTRIAL APPLICABILITY

The water and oil repellent composition of the present invention, which has as an effective component a copolymer which substantially comprises polymerized units of $R^f$ monomer (a) wherein the melting point of fine crystals derived from the $R^f$ groups in the homopolymer does not exist or is at most 50° C., and polymerized units of monomer (b) containing an organic group other than an $R^f$ group wherein the melting point of fine crystals derived from the organic groups in the homopolymer is at least 30° C., can impart water and oil repellency despite there are no fine crystals specific to $R^f$ groups. Further, since the composition forms a flexible film, the water and oil repellency can be imparted to an object without impairing the quality such as the hand. It can develop excellent water and oil repellency, even if it is treated at a lower temperature as compared with conventional product. Further, since it is excellent in the durability against abrasion or washing, the initial performance can be maintained as compared with conventional products. Still further, a coating film which is flexible and not likely to impair the bonding property, can be formed, whereby it is possible to further form a functional film on such a coating film by coating.

The entire disclosure of Japanese Patent Application No. 2001-115676 filed on Apr. 13, 2001 including specification, claims and summary is incorporated herein by reference in its entirety.

What is claimed is:

1. A water and oil repellent composition comprising a copolymer consisting essentially of polymerized units of the following monomer (a) and polymerized units of the following monomer (b):

monomer (a): a monomer having a polyfluoroalkyl group, wherein the melting point of fine crystals derived from the polyfluoroalkyl groups in a homopolymer of said monomer, does not exist or is at most 50° C., monomer (b): a monomer having an organic group other than a polyfluoroalkyl group, (wherein the melting point of fine crystals derived from the organic groups in a homopolymer of said monomer, is at least 30° C., wherein the monomer (a) is a compound represented by the formula $(Z—Y)_nX$, wherein the symbols in the formula have the following meanings:

Z: a perfluoroalkyl group having a number of carbon atoms of at most 6, or a group represented by the formula $C_mF_{2m+1}O(CF_2CF(CF_3)O)_dCF(CF_3)—$, wherein m is an integer of from 1 to 6, and d is an integer of from 1 to 4, Y: a bivalent organic group or a single bond, X: a polymerizable unsaturated group, which is —CR=CH$_2$, —C(O)OCR=CH$_2$, —OC(O)CR=CH$_2$, -or —OCH=CH$_2$ when n is 1, and is =CH(CH$_2$)$_q$CR=CH$_2$, =CH(CH$_2$)$_q$C(O)OCR=CH$_2$, =CH(CH$_2$)$_q$OC(O)CR=CH$_2$ or —OC(O)CH=CHC(O)O— when n is 2, provided that R is a hydrogen atom, a methyl group or a halogen atom, φ is a phenylene group and q is an integer from 0 to 4.

2. The water and oil repellent composition according to claim 1, wherein in the copolymer, the molar ratio of polymerized units of monomer (a)/polymerized units of monomer (b) is from 0.2/1 to 5/1.

3. The water and oil repellent composition according to claim 1, wherein the monomer (b) is an acrylate or a methacrylate, which has, as an organic group, a saturated hydrocarbon group having a number of carbon atoms of at least 15.

4. The water and oil repellent composition according to claim 1, wherein Z is a perfluoroalkyl group having a number of carbon atoms of at most 6.

5. The water and oil repellent composition according to claim 1, wherein Z is a group represented by the formula $C_mF_{2m+1}O(CF_2CF(CF_3)O)_dCF(CF_3)—$, wherein m is an integer of from 1 to 6, and d is an integer of from 1 to 4.

6. The water and oil repellent composition according to claim 1, wherein Y is a bivalent organic group.

7. The water and oil repellent composition according to claim 1, wherein Y is a single bond.

8. The water and oil repellent composition according to claim 1, wherein n=1.

9. The water and oil repellent composition according to claim 1, wherein n=2.

10. The water and oil repellent composition according to claim 1, wherein X is a polymerizable unsaturated group, which is —CR=CH$_2$.

11. The water and oil repellent composition according to claim 1, wherein X is a polymerizable unsaturated group, which is —C(O)OCR=CH$_2$.

12. The water and oil repellent composition according to claim 1, wherein X: a polymerizable unsaturated group, which is —OC(O)CR=CH$_2$.

13. The water and oil repellent composition according to claim 1, wherein X is a polymerizable unsaturated group, which is —OCH=CH$_2$.

14. The water and oil repellent composition according to claim 1, wherein X is a polymerizable unsaturated group, which is =CH(CH$_2$)$_q$CR=CH$_2$.

15. The water and oil repellent composition according to claim 1, wherein X is a polymerizable unsaturated group, which is =CH(CH$_2$)$_q$C(O)OCR=CH$_2$.

16. The water and oil repellent composition according to claim 1, wherein X is a polymerizable unsaturated group, which is =CH(CH$_2$)$_q$OC(O)CR=CH$_2$.

17. The water and oil repellent composition according to claim 1, wherein X is a polymerizable unsaturated group, which is —OC(O)CH=CHCOO—.

18. The water and oil repellent composition according to claim 1, wherein X contains the group R and R is hydrogen.

19. The water and oil repellent composition according to claim 1, wherein X contains the group R and R is methyl.

20. The water and oil repellent composition according to claim 1, wherein X contains the group R and R is halogen.

21. A material to which the water and oil repellant composition according to claim 1 has been applied.

22. The material of claim 21 which comprises leather.

23. A method for imparting water or oil repellency, or both, to a material, comprising:

applying the water and oil repellant composition according to claim 1 to said product.

* * * * *